No. 643,483.  
A. B. DISS.  
CASTER.  
(Application filed May 25, 1899.)  
Patented Feb. 13, 1900.

(No Model.)

Witnesses:  
J. Staib  
Chas. H. Smith

Inventor:  
Albert B. Diss  
per L. W. Serrell & Son  
Attys.

THE NORRIS PETERS CO., PHOTO-LITHO., WASHINGTON, D. C.

UNITED STATES PATENT OFFICE.

ALBERT B. DISS, OF NEW YORK, N. Y.

CASTER.

SPECIFICATION forming part of Letters Patent No. 643,483, dated February 13, 1900.

Application filed May 25, 1899. Serial No. 718,134. (No model.)

*To all whom it may concern:*

Be it known that I, ALBERT B. DISS, a citizen of the United States, residing in the city of New York, borough of Brooklyn, in the county of Kings and State of New York, have invented a new and useful Improvement in Casters, of which the following is a specification.

In connection with casters antifriction or ball bearings of various kinds have heretofore been employed. In most of these devices the balls were readily separated from the other parts of the caster and became lost.

The object of my invention is to overcome this difficulty and to connect the balls with the caster and support the same in such a way that the full function of the balls may be availed of.

In carrying out my invention I provide a ball-platform located, preferably, between the top of the jaws and the bearing-disk that comes below the support of the article of furniture. This ball-platform is provided with openings slightly larger than the balls, and the edges of the openings are made as cupped-up walls, and the balls are provided with short axes or shafts seated in notches made in said cupped-up walls. The axes or shafts of the balls are set radial to the pintle of the caster, so that the balls rotate in the direction of movement, the ball-platform serving as a support and carrier for the balls in assembling the parts and as a guide in which the balls rotate, and at the same time the platform prevents the weight pressing the balls laterally away from the caster.

Figure 1:
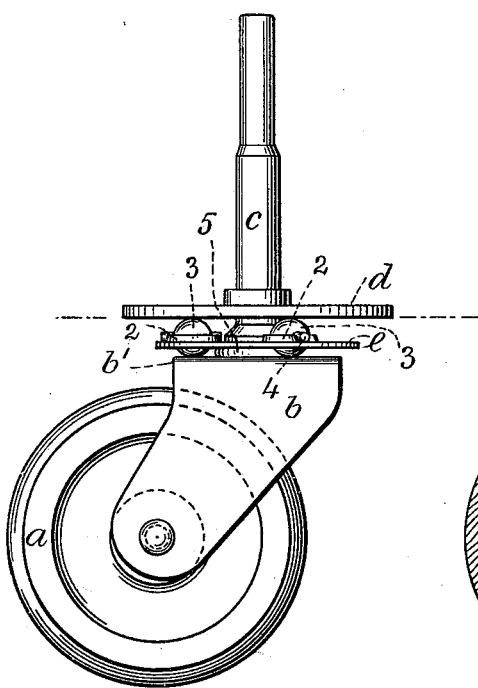
Figure 2:
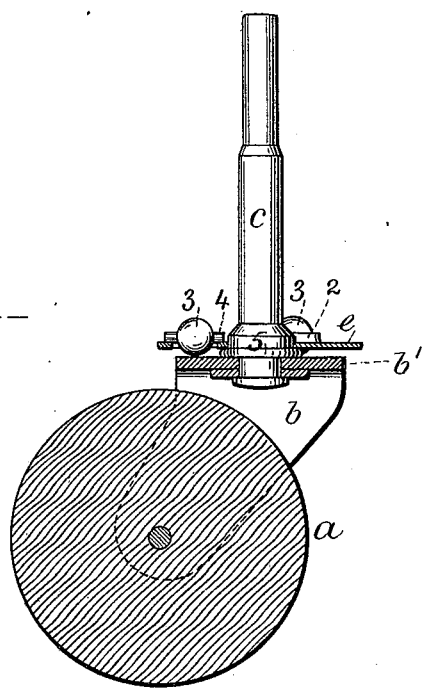
Figure 3:
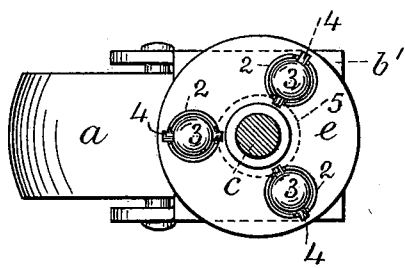
Figure 4:
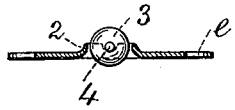

In the drawings, Figure 1 is an elevation of the wheel-jaws and adjacent parts of the caster, representing my improvement. Fig. 2 is a vertical section and partial elevation; and Fig. 3 a plan view, and Fig. 4 a vertical section, through the ball-platform at right angles to the position shown in Fig. 2.

The caster-wheel $a$, the jaws $b$, the jaw-top $b'$, and the vertical pintle $c$ are of the usual character. The disk $d$ is also of usual construction, surrounding the pintle and coming below the end of the leg of the furniture or other article to which the caster is connected.

The ball-platform $e$ is a circular disk with openings at equal distances apart. In making these openings a suitable tool is employed that forms therein the cupped-up walls 2. Any number of these openings that may be desired can be employed, according to the number of balls. I have, however, shown three as serving the purpose and as being the minimum number that it is desirable to employ. These openings are slightly larger than the balls 3, and these balls are provided with axes or shafts 4. These shafts are set radial to the center of the ball-platform, which also makes the axes radial to the pintle of the caster, and the axes or shafts of the balls are set in notches made in opposite sides of the cupped-up walls 2. The balls being set with their axes radial permits the balls to rotate in the direction of the travel of the platform, the balls bearing underneath on the jaw-top $b'$ and above on the under side of the disk $d$ of the caster. The base of the pintle where the same joins with the caster is preferably made with an enlargement or shoulder 5, coming beneath the ball-platform and serving as a support therefor.

While I have shown three balls with their axes or shafts in the ball-platform, I desire to state that any number desired may be employed in excess of the three, according to the object desired and the weight to be carried by the caster, three being the minimum number that can be successfully employed.

I claim as my invention—

The combination with the wheel, the jaws, the vertical pintle connected therewith and the disk surrounding the pintle and upon which the caster-leg rests, of a ball-platform between the top of the jaws and the disk and having cupped-up walls 2 with opposite notches formed in said walls, balls having axes or shafts, the notches being made so as to cause the axes or shafts to set radial to the caster-pintle and to be received in said notches, the openings in said ball-platform being larger than the balls so that the balls will turn freely therein on their axes or shafts as the ball-platform turns with the movement of the parts in use, substantially as set forth.

Signed by me this 23d day of May, 1899.

ALBERT B. DISS.

Witnesses:
   GEO. T. PINCKNEY,
   S. T. HAVILAND.